US007816642B2

(12) United States Patent
Ou et al.

(10) Patent No.: US 7,816,642 B2
(45) Date of Patent: Oct. 19, 2010

(54) PRESSURE-INDUCED COUNTER WITH DELAY UNIT

(75) Inventors: Chun-Nan Ou, Taipei Hsien (TW); Hu Xie, Shenzhen (CN); Cheng-Bin Su, Shenzhen (CN); Jian-Long Xing, Shenzhen (CN); Shui-Hua Cheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 162 days.

(21) Appl. No.: 12/238,411

(22) Filed: Sep. 25, 2008

(65) Prior Publication Data

US 2009/0262883 A1 Oct. 22, 2009

(30) Foreign Application Priority Data

Apr. 22, 2008 (CN) ........................ 2008 1 0301238

(51) Int. Cl.
*G01D 5/34* (2006.01)

(52) U.S. Cl. ................................ 250/231.1; 250/214 R

(58) Field of Classification Search ............ 250/227.22, 250/231.1, 221, 214 R; 200/61.3, 61.85, 200/61.27, 61.39, 61.47, 33 R, 513; 340/452, 340/457, 475, 529
See application file for complete search history.

(56) References Cited

U.S. PATENT DOCUMENTS 4,673,919 A * 6/1987 Kataoka ...................... 341/11

* cited by examiner

*Primary Examiner*—Que T Le
(74) *Attorney, Agent, or Firm*—Frank R. Niranjan

(57) ABSTRACT

A pressure-induced counter includes a pressure acquisition unit, a delay unit and a counter unit. The pressure acquisition unit is electrically coupled to the counter unit via the delay unit. The pressure acquisition unit is configured for acquiring a pressure signal of an external pressure applied thereon to generate and output an original electrical signal corresponding to the pressure signal. The delay unit is configured for processing the original electrical signal outputted from the pressure acquisition unit to obtain a processed electrical signal by depressing the leading-edge jitter existing therein. The counter unit is configured for receiving the processed electrical signal transmitted from the delay unit and taking count of the received signals.

20 Claims, 2 Drawing Sheets

PRESSURE-INDUCED COUNTER WITH DELAY UNIT

BACKGROUND

1. Technical Field

The present invention relates to pressure-induced counters and, particularly, to a pressure-induced counter which can depress leading-edge jitters existing in electrical signals and count accurately.

2. Description of the Related Art

A pressure-induced relay is usually used as a countable signal source for a counter when the pressure-induced relay has been pressed by an external force. A level switch equipped in the pressure-induced relay is generally selected from the mechanical elastic switches. The selected mechanical elastic switch completes the transition between a high-level position and a low-level position for generating a countable signal by connecting and disconnecting the corresponding resilient contacts in the mechanical elastic switch. However, due to the resilient effect of the resilient contacts, the resilient contacts inevitably vibrate continuously during connections and disconnections, which induces a phenomenon called “leading-edge jitter” in the signals. As a result, a number of countable signals are generated by the pressure-induced relay in one period of transition, wherein all the signals can be counted by the counter. As a result, the accuracy of the counter is impaired.

Therefore, it is desired to provide a pressure-induced counter which can overcome the above-described problem.

SUMMARY

An exemplary pressure-induced counter includes a pressure acquisition unit, a delay unit and a counter unit. The pressure acquisition unit is electrically coupled to the counter unit via the delay unit. The pressure acquisition unit is configured for acquiring a pressure signal of an external pressure applied thereon to generate and output an original electrical signal corresponding to the pressure signal. The delay unit is configured for processing the original electrical signal outputted from the pressure acquisition unit to get a processed electrical signal by depressing the leading-edge jitters existing therein. The counter unit is configured for receiving the processed electrical signal transmitted from the delay unit and taking count of the received signals.

Those and other advantages and novel features will be more readily apparent from the following detailed description set forth below taken in conjunction with the accompanying drawings.

DETAILED DESCRIPTION OF THE PREFERRED EMBODIMENTS

Figure 1:
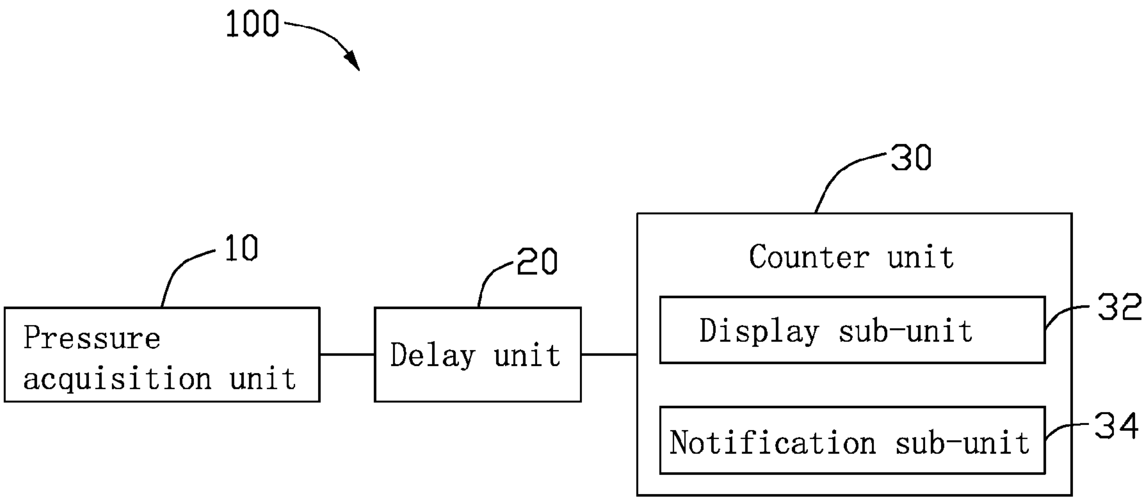
FIG. 1 is a schematic block diagram of a pressure-induced counter according to a first exemplary embodiment.

Referring FIG. 1, a pressure-induced counter 100 according to a first exemplary embodiment of the present invention includes a pressure acquisition unit 10, a delay unit 20 and a counting unit 30. The pressure acquisition unit 10 is electrically coupled to the counting unit 30 via the delay unit 20.

The pressure acquisition unit 10 is configured for acquiring a pressure signal of an external pressure applied thereon to generate and output an original electrical signal corresponding to the pressure signal. In this exemplary embodiment, the pressure acquisition unit 10 is a pressure-induced relay.

The delay unit 20 is configured for processing the original electrical signal output from the pressure acquisition unit 10 to get a processed electrical signal by diminishing the leading-edge jitter existing therein. The operation details of the delay unit 20 are described as follows.

When the delay unit 20 receives every original electrical signal output from the pressure acquisition unit 10, the delay unit 20 delays transmitting of the signal for a predefined period of time until the phenomenon of leading-edge jitter existing in the signal has disappeared. The predefined period of time is configured and stored in the delay unit 20. The predefined period of time is longer than the whole acquiring time of the pressure acquisition unit 10 for completing the acquisition of the external pressure. As such, the leading-edge jitter existing in the original electrical signal has been depressed. As a result, the final signal transmitted by the delay unit 20 is a single and stable signal.

Alternatively, when the delay unit 20 receives a first original electronic signal outputted from the pressure acquisition unit 10, the delay unit 10 instantly transmits the signal to the counter 30 for counting and then is delayed for a predefined period of time to receive a next original electrical signal. The predefined period of time spent by the delay unit 20 is longer than the acquiring time of the pressure acquisition unit 10 for completing the acquisition of the external pressure. In this process, the predefined period of time spent by the delay unit 20 is significantly transient. Generally, the delayed time is about 5~20 ms. An interval between two external pressure acquisitions is always decided by a position change of a workpiece to be processed. The time needed for changing the position of the workpiece is significantly longer than the delayed time. In other words, the interval between two external pressure acquisitions is significantly longer than the delayed time. In other words, no new original signal is further generated during the delayed time of the delay unit 20. Therefore, no count will be left out and the leading-edge jitter existing in the original electrical signal can also be depressed by the delay unit 20.

The delay unit 20 may include a master control chip. In this embodiment, the master control chip may be a type of Intel® 8052 chip selected from the Intel® MCS® 51/251 Microcontrollers.

The counter unit 30 is configured for receiving the processed electrical signal transmitted from the delay unit 20 and taking count of the received signals. The counter unit 30 further includes a display sub-unit 32 configured for displaying the amount counted by the counter unit 30 and a notification sub-unit 34 configured for notifying the user that the amount counted by the counter unit 30 is equal to a predefined amount that is stored in the counter unit 30. The counter unit 30 may be a single counting circuit or an individual counter.

Figure 2:
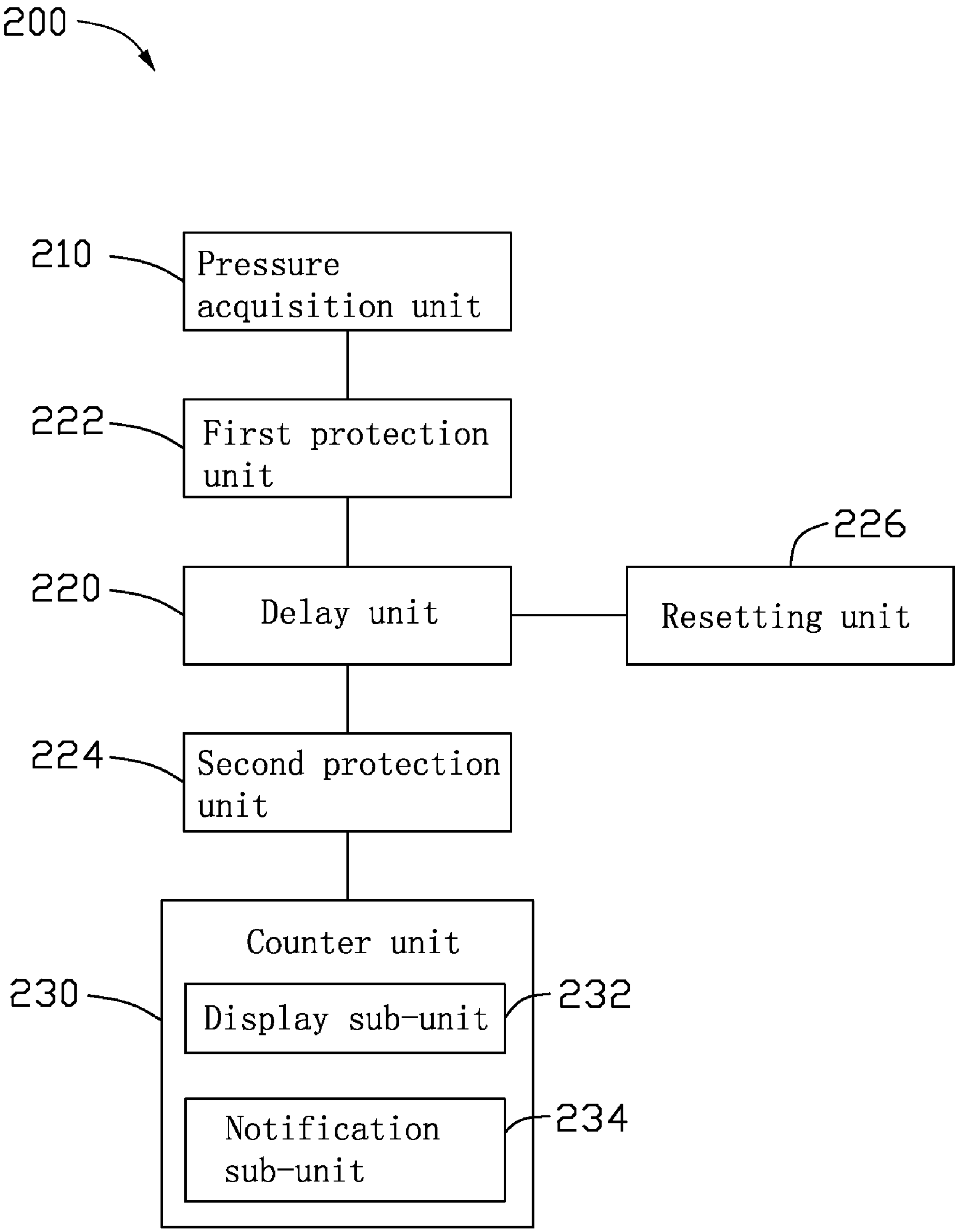
FIG. 2 is a schematic block diagram of a pressure-induced counter according to a second exemplary embodiment.

Referring FIG. 2, a pressure-induced counter 200 according to a second exemplary embodiment is disclosed. The pressure-induced counter 200 includes a pressure acquisition unit 210, a delay unit 220 and a counting unit 230, similar to the above-mentioned first embodiment. The counting unit 230 further includes a display sub-unit 232 and a notification sub-unit 234. The pressure-induced counter 200 further includes a first protection unit 222, a second protection unit 224 and a resetting unit 226.

The pressure acquisition unit 210 is electrically coupled to the delay unit 220 via the first protection unit 222. The delay unit 220 is electrically coupled to the counter unit 230 via the second protection unit 224. The first and second protection units 222 and 224 are respectively configured for protecting the delay unit 220 and the counter unit 230 from damages caused by over-voltage/over-current/high magnetic field in the usage of the pressure-induced counter 200. The first and second protection units 222 and 224 may be one selected from the group consisting of opto-isolator, optical isolators, optocoupler, photocoupler and photoMOS. The first and second protection units 222 and 224 can employ a short optical transmission path to transfer a signal between elements of a circuit, which are typically a transmitter and a receiver, such as an LED and a phototransistor. Electrical isolation occurs when the signal is transmitted from an electrical signal form to an optical signal form, and then back to an electrical signal form, i.e., electrical contact along the path is broken. Especially, in present invention, when an over-voltage/over-current/high magnetic field is applied on the pressure acquisition unit 210, the first protection unit 222 generates an optical signal corresponding to the over-voltage/over-current/high magnetic field by a transmitter, such as an LED. Then, an electrical signal is generated by a receiver, such as a phototransistor, corresponding to the optical signal generated by the transmitter, wherein a current output by the first protection unit 222 corresponding to the electrical signal is normal or receivable. The delay unit 220 coupled to the first protection unit 222 receives the electrical signal output from the first protection unit 222. The electrical signals output from the first protection unit 222 have been separated from the over-voltage/over-current/high magnetic field applied on the acquisition unit 210 to prevent any damage to the delay unit 220.

The resetting unit 226 is electrically connected to the delay unit 220 and configured for resetting the delay unit 220 when the delay unit 220 malfunctions or is in the process of debugging. The resetting unit 226 may be integrated with the delay unit 220. The resetting unit 226 can operate automatically by monitoring the running state of the delay unit 220 and resetting the delay unit 220 when it malfunctions. Alternatively, the resetting unit 226 also can be operated manually.

The pressure-induced counter in present invention adopts a delay unit installed between the pressure acquisition unit and the counter unit to depress leading-edge jitters existing in the ordinary signals output from the pressure acquisition unit so that the counter unit can accurately count.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A pressure-induced counter comprising:

a pressure acquisition unit configured for acquiring a pressure signal of an external pressure applied thereon to generating and outputting an original electrical signal corresponding to the pressure signal;

a delay unit electrically coupled to the pressure acquisition unit, and configured for processing the original electrical signal outputted from the pressure acquisition unit to obtain a processed electrical signal by depressing the leading-edge jitter existing therein; and a counter unit electrically coupled to the delay unit and configured for receiving the processed electrical signal transmitted from the delay unit and taking count of the received signals.

2. The pressure-induced counter as claimed in claim 1, wherein the delay unit delays the transmission of the original signal for a predefined period of time stored in the delay unit when the original electrical signal outputted from the pressure acquisition unit is received.

3. The pressure-induced counter as claimed in claim 1, wherein the delay unit receives a first original electrical signal output from the pressure acquisition unit, the delay unit instantly transmits the signal to the counter unit for counting and then delays for a predefined period of time to receive a next original electrical signal.

4. The pressure-induced counter as claimed in claim 2, wherein the pressure acquisition unit is a pressure-induced relay, and the predefined period of time is longer than whole acquiring time of the pressure acquisition unit for completing the acquisition of the external pressure.

5. The pressure-induced counter as claimed in claim 3, wherein the pressure acquisition unit is a pressure-induced relay, and the predefined period of time is longer than the acquiring time of the pressure acquisition unit for completing the acquisition of an external pressure.

6. The pressure-induced counter as claimed in the claim 1, wherein the counter unit includes a display sub-unit that is configured for displaying the amount counted by the counter unit.

7. The pressure-induced counter as claimed in the claim 6, wherein the counter unit includes a notification sub-unit that is configured for notifying an user when the amount counted by the counter unit is equal to a predefined amount stored in the counter unit.

8. The pressure-induced counter as claimed in the claim 1, wherein the pressure-induced counter further includes a first protection unit configured for providing protection for the delay unit from over-voltage, over-current or high magnetic field conditions in the pressure-induced counter, and the pressure acquisition unit is coupled to the delay unit via the first protection unit.

9. The pressure-induced counter as claimed in the claim 1, wherein first protection unit is one selected from the group consisting of opto-isolator, optical isolators, optocoupler, photocoupler and photoMOS.

10. The pressure-induced counter as claimed in the claim 8, wherein the pressure-induced counter further includes a second protection unit configured for providing protection for the counter unit from over-voltage, over-current or high magnetic field condition in the pressure-induced counter, and the delay unit is coupled to the counter unit via the first protection unit.

11. The pressure-induced counter as claimed in the claim 10, wherein a second protection unit is one selected from the group consisting of opto-isolator, optical isolators, optocoupler, photocoupler and photoMOS.

12. The pressure-induced counter as claimed in the claim 10, wherein the pressure-induced counter further includes a resetting unit configured for resetting the delay unit.

13. The pressure-induced counter as claimed in the claim 12, wherein the resetting unit can operate automatically by monitoring the running state of the delay unit and resetting the delay unit when the delay unit fails to function.

14. The pressure-induced counter as claimed in the claim 12, wherein the counter unit includes a display sub-unit configured for displaying the amount counted by the counter unit.

15. The pressure-induced counter as claimed in the claim 14, wherein the counter unit includes a notification sub-unit configured for notifying a user when the amount counted by the counter unit is equal to a predefined amount stored in the counter unit.

16. A pressure-induced counter comprising:

a pressure acquisition unit sensing presence of an external pressure applied thereon and outputting a first electrical signal;

a delay unit electrically coupled to said pressure acquisition unit for receiving said first electrical signal from said pressure acquisition unit, said delay unit processing said first electrical signal by delaying a predefined period of time and outputting a second electrical signal corresponding to said first electrical signal after processing; and a counter unit electrically coupled to said delay unit for receiving said second electrical signal from said delay unit, and counting based on said received second electrical signal.

17. The pressure-induced counter as claimed in claim 16, wherein said delay unit delays transmission of said first electrical signal for said predefined period of time so as to generate said second electrical signal for outputting when said first electrical signal outputted from said pressure acquisition unit is received by said delay unit.

18. The pressure-induced counter as claimed in claim 16, wherein said delay unit delays receipt of a next first electrical signal from said pressure acquisition unit for said predefined period of time so as to generate said second electrical signal for outputting after said first electrical signal outputted from said pressure acquisition unit is received by said delay unit and outputted thereby instantly.

19. A pressure-induced counter comprising:

a pressure acquisition unit sensing presence of an external pressure applied thereon and outputting a first electrical signal;

a delay unit electrically coupled to said pressure acquisition unit for receiving said first electrical signal from said pressure acquisition unit, said delay unit processing said first electrical signal by prolonging a processing time of said first electrical signal and outputting a second electrical signal corresponding to said first electrical signal after processing; and a counter unit electrically coupled to said delay unit for receiving said second electrical signal transmitted from said delay unit, and counting based on said received second electrical signal.

20. The pressure-induced counter as claimed in claim 19, wherein said delay unit achieves prolonging said processing time of said first electrical signal by waiting a predefined period of time so as to generate said second electrical signal either before or after said first electrical signal received by said delay unit is further outputted.

* * * * *